Feb. 19, 1924.
E. H. SNEAD
1,484,417
MOVABLE HEADLIGHT
Original Filed June 3, 1922     3 Sheets-Sheet 1
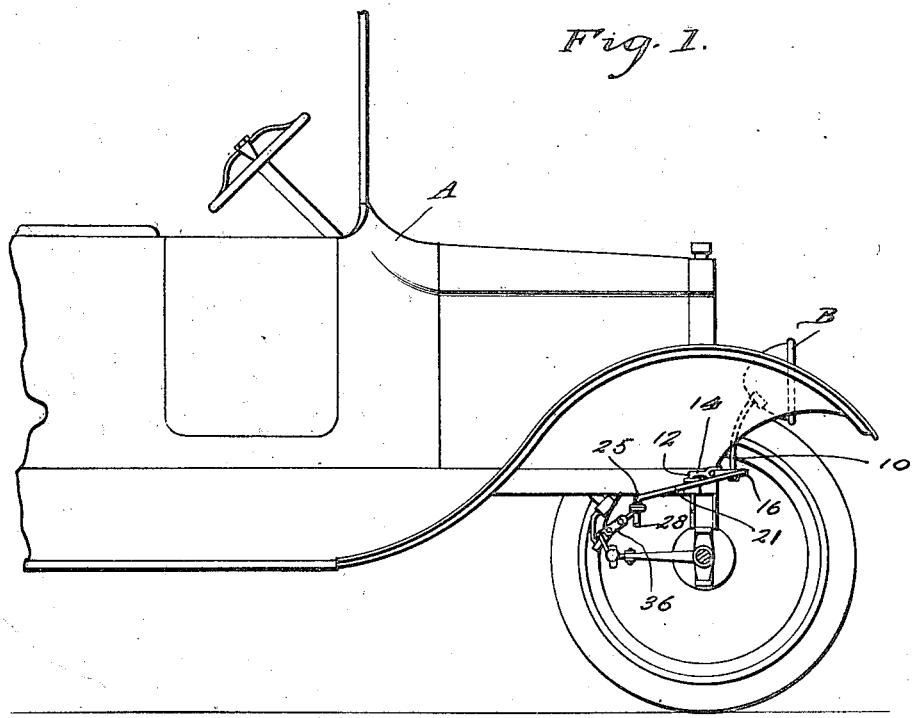
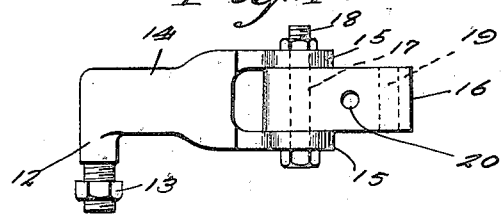
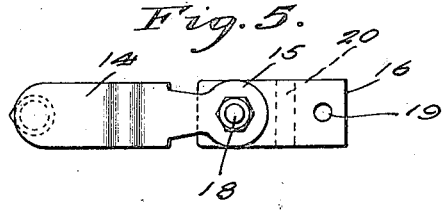

Feb. 19, 1924.

E. H. SNEAD

MOVABLE HEADLIGHT

Original Filed June 3, 1922

E. H. Snead INVENTOR

Feb. 19, 1924.
E. H. SNEAD
1,484,417
MOVABLE HEADLIGHT
Original Filed June 3, 1922    3 Sheets-Sheet 3
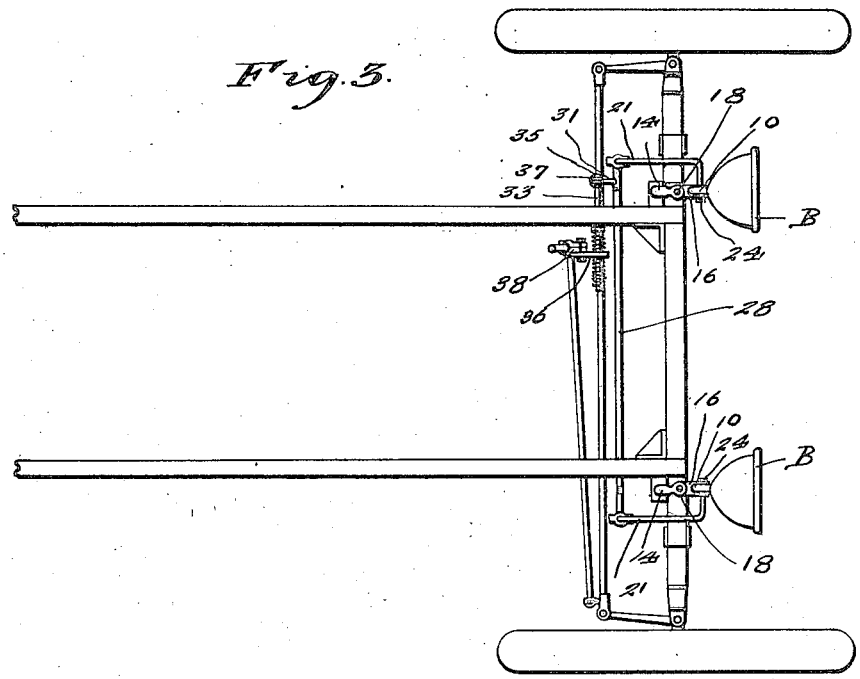
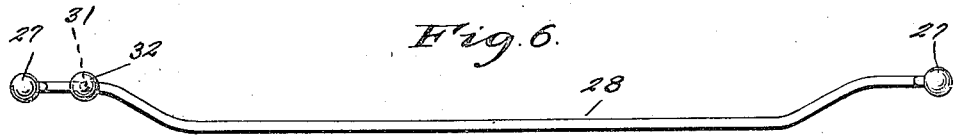
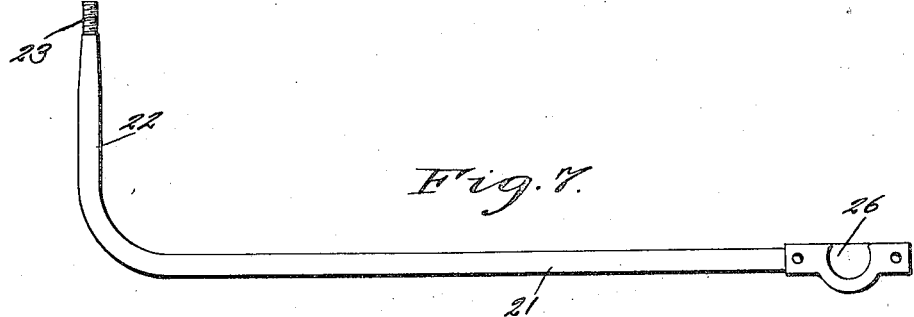

Patented Feb. 19, 1924.

1,484,417

UNITED STATES PATENT OFFICE.

EMMETT H. SNEAD, OF DANVILLE, VIRGINIA.

MOVABLE HEADLIGHT.

Application filed June 3, 1922, Serial No. 565,556. Renewed January 21, 1924.

*To all whom it may concern:*

Be it known that I, EMMETT H. SNEAD, a citizen of the United States, residing at Danville, in the county of Pittsylvania and State of Virginia, have invented new and useful Improvements in Movable Headlights, of which the following is a specification.

This invention relates to dirigible headlights for motor operated vehicles, wherein the lights are turned in unison incident to the turning of the front wheels for the purpose of steering the vehicle, so that the light rays are always maintained directly in advance of the course pursued by the vehicle, the invention residing in the construction, combination and arrangement of parts as claimed.

In the drawing forming part of this application, like numerals of reference indicate similar parts in the several views, and wherein:

Figure 1 is a side view in elevation.

Figure 3 is a fragmentary plan view of the running gear of the vehicle showing the application of the invention.

Figure 4 is a detail view of the lamp support.

Figure 5 is a similar view taken at a right angle to Figure 4.

Figure 6 is a detail view of the rod connecting the lamp support.

Figure 7 is a detail view of one of the arms connecting said rod with the lamp.

Figure 2:
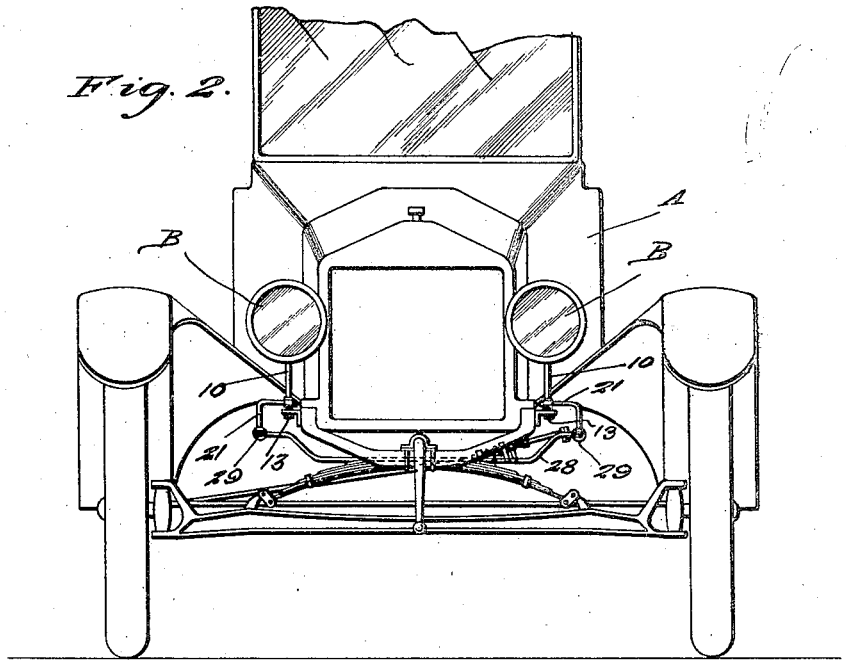
Figure 2 is a front view in elevation.
Figure 8:
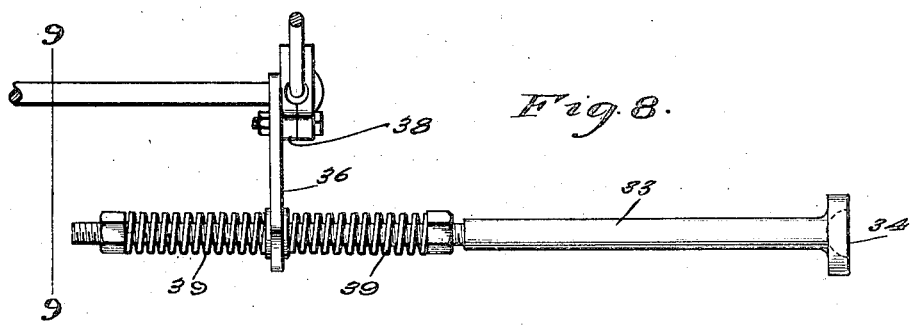
Figure 8 is a detail view of the connection between the above mentioned rod and the steering mechanism of the vehicle.
Figure 9:
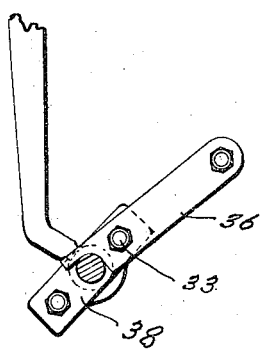
Figure 9 is a sectional view taken on line 9—9 of Figure 8.

Referring to the drawings in detail A indicates generally a portion of a motor operated vehicle and wherein B indicates the headlights. Each of these headlights includes a post 10 which is supported in a manner to be presently described. For each headlight I provide a support which consists of a substantially L-shaped bracket, the short branch 12 of which is threaded and has associated therewith a nut 13, this particular branch of the bracket being adapted to be secured to some appropriate part of the frame. The remaining branch 14 of the bracket is bifurcated at one end, and the separated portions 15 defined by said bifurcation receive therebetween, the movable headlight support which is in the nature of a block 16. This block is provided with a bore 17 which receives a bolt 18 which is also passed through the separated portions defined by said bifurcation, and the lamp support or block is pivoted on this bolt. This block 16 is provided with bores 19 and 20 respectively which are arranged at right angles to each other, the bore 19 receiving the post of the adjacent headlight, so that the said headlight and its support or block 16 turns as a unit in a manner to be hereinafter described.

In conjunction with each headlight I make use of an angularly shaped arm which is indicated generally at 21, and one end of this arm is offset substantially at a right angle as at 22, and is threaded as at 23. This threaded extremity passes through the bore 20 of the adjacent support or block 16, and then has associated therewith a nut 24. The opposite end of the arm 21 is also angularly disposed and is arranged substantially at a right angle to the extremity 22, this portion of the arm being indicated at 25 is enlarged and formed with a socket 26 to accommodate the ball 27 formed on the adjacent end of a connecting rod 28. This rod 28 is arranged beneath the frame of the vehicle, and the ball or spherical end portions 27 of this rod, after being positioned within the socket of the arm 21 are secured thereto by means of a brace 29. The rod 28 obviously provides a connection between the headlights, so that any movement of this rod 28 results in moving the headlights in unison. It is of course understood that the lamp supports or blocks 16 are pivoted in their brackets 14 for horizontal swinging movement, and that the rod 28 is adapted to be reciprocated incident to the steering of the vehicle, to impart such swinging movement to the blocks 16, and in this manner the lamps or headlights are turned in the same general direction in which the machine is turned and thus maintain the light rays directly in advance of the course pursued by the vehicle.

In order to control the movement of the rod 28, or in other words, to move this rod incident to the steering of the vehicle, I provide the rod 28 with an extension 31 at a point adjacent one end and this extension terminates to provide a ball or spherical portion 32. A short rod 33 is provided with a socket 34 at one end to accommodate the spherical end portion 32, and the parts are held associated or secured together by means of a plate 37 which is also provided with a socket 35. This short rod slides through an opening in a plate 36, and this plate is secured to the member 38 forming part of the steering mechanism of the vehicle. Surrounding the short rod 33 are coiled springs 39, these springs being arranged at opposite sides of the plate just referred to, and serve in the capacity of cushioning members to relieve the parts of any undue strain incident to the steering of the vehicle and the consequent turning of the headlight. However, it is manifest that when the vehicle is steered in either direction, the plate 37 is moved, thereby imparting movement to the short rod 33, which in turn by reason of its connection with the rod 28 moves the latter transversely of the running gear of the vehicle, and as the lamp supports 16 are connected with the terminals of this rod 28, the lamp headlights are turned in unison in the same general direction in which the machine is turned.

While it is believed that from the foregoing description the nature and advantages of the invention will be readily apparent, I desire to have it understood that I do not limit myself to what is herein shown and described, and that such changes may be resorted to when desired as fall within the scope of what is claimed.

What is claimed is:

The combination with a vehicle having a steering mechanism, and headlights each including a post, of a bracket for each headlight, a block pivoted on said bracket for horizontal swinging movement, each block including spaced bores arranged at right angular relation, one of said bores receiving the adjacent post of the headlights, angular shaped arms for the respective blocks, one end of each arm being received by the remaining bore of said block, a rod arranged transversely of the running gear of the vehicle, said arms having ball and socket connections with the terminals of said rod, a second rod having one end connected with the first mentioned rod by a ball and socket connection, a plate slidably supported on the second mentioned rod and connected with the steering mechanism of the vehicle, coiled springs surrounding the second mentioned rod and arranged at the opposite sides of said plate defining cushioning means, and said rod moving in unison incident to the steering of the vehicle to simultaneously turn the headlights as and for the purpose specified.

In testimony whereof I affix my signature.

EMMETT H. SNEAD.